July 6, 1937.  F. E. JACKSON  2,086,318
MANHOLE COVER REMOVER
Filed Dec. 15, 1936
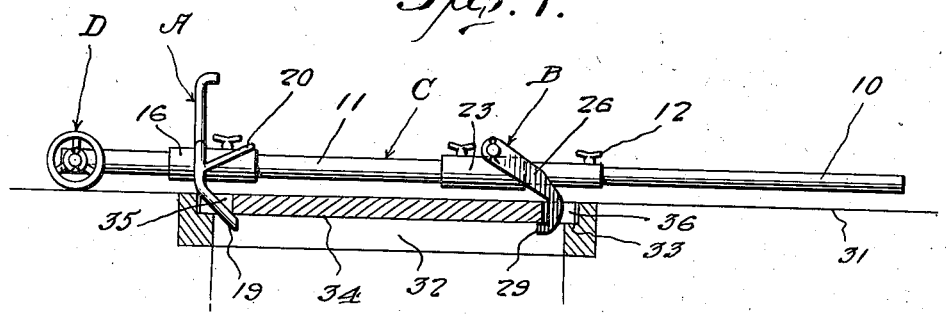
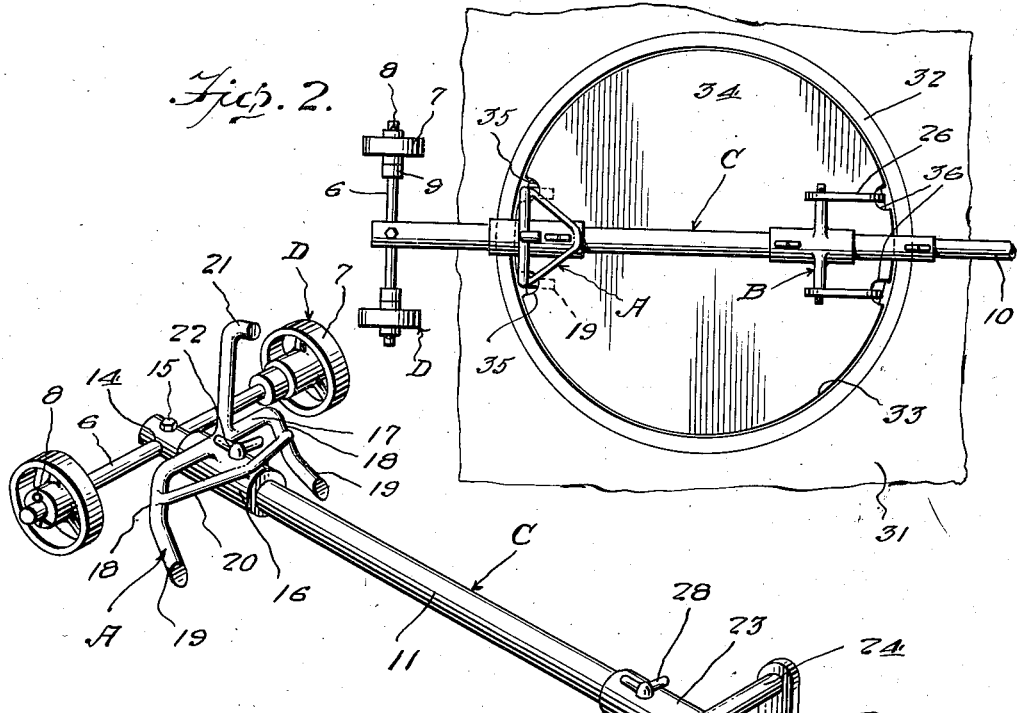
Inventor
Francis E. Jackson, Deceased
By Mildred E. Jackson,
Administratrix
By Riordan & Riordan
Attorneys Patented July 6, 1937

2,086,318

UNITED STATES PATENT OFFICE 2,086,318

MANHOLE COVER REMOVER

Francis E. Jackson, deceased, late of Los Angeles, Calif., by Mildred E. Jackson, administratrix, Los Angeles, Calif.

Application December 15, 1936, Serial No. 116,032

9 Claims. (Cl. 214—65.5)

This invention relates to article handling devices, and the primary object of the invention is to devise a very light manually operated vehicle in the nature of a two-wheeled cart, which is capable of clamping directly to an unwieldy object like flat plates, and is particularly adaptable to manhole covers, whereupon the cover may be lifted and transported, all of which only requires the service of one workman.

Another feature of the invention is the provision of gripping members on the cart wherein at least one of these gripping members is adjustable to accommodate the clamping of covers of varying sizes.

A further object of the invention is to provide one of the gripping members with one or more claws that may be trained, by prying action in manipulating the cart, into gripping relation with the cover.

The present invention is distinguished from trucks and barrows constructed on the principle of a cart because in these devices it is not necessary to retain the articles carried thereby in clamped relation. Such devices are operated with the burden or articles resting on the frame or platform and do not require any clamping action. In the present invention the gripping members are adapted to clamp to the object and carry it suspended below the frame or handle.

The present invention is also distinguished from that character of previous inventions where provision is made on the cart to hook to and drag the object on the surface of the ground or floor by perambulating with the cart. In applicant's invention the object is not dragged but lifted bodily from countersunk relation and transported on the cart out of contact with the ground or floor.

With the foregoing and other objects in view, the invention consists of a novel construction, combination and arrangement of parts as will appear in the following description and drawing, and although the preferred embodiment of the invention is shown and described, it is to be understood that changes, modifications and variations of the invention may be resorted to without departing from the spirit of the invention in the appended claims.

In the drawing wherein like reference characters indicate like parts throughout the several views:

Fig. 1 is a vertical section through a manhole showing in side elevation the device of the present invention clamped to the cover ready to lift and transport the cover.

Fig. 2 is a top plan view thereof.

Fig. 3 is a perspective view of the device detached from the cover.

The invention comprehends at least two gripping members A and B mounted in opposed relation on a manually operated cart. The cart consists of a frame or handle C connected at one end, in a manner to presently appear, to rock on the truck, running gear, or two-wheeled support D.

The truck D is constructed with a straight, round, steel rod 6 which serves as an axle. On each end of the axle is journalled a wheel or roller 7 held in place on the outside by a cotter pin 8. There is one collar 9 for each wheel mounted on the axle 6 and these collars prevent the wheels from wabbling. It will be noted that the axle 6 is of sufficient length to provide a stable truck that has the maximum stability, while the cart is being manipulated; and also a considerable free part between the wheels to furnish ample space to attach one end of the frame or handle C.

The frame or handle C is straight and is constructed of a pair of tubular pipe sections, the outer section 10 of which telescopes into the end of inner section 11. This construction provides a single handle or frame which may be extended or contracted to any desired length limited by the length of the inner section acting as a socket for the outer section. The two sections may be locked together in adjusted position by the set screw 12 engaging in a threaded opening 13 near the outer end of the inner section 11 and the inner end of the set screw bears against the outer periphery of the outer section 10. The telescoping sections 10, 11 of handle or frame C extend at right angles to axle 6. The inner end of section 11 has registering openings 14—14 in the diametrically opposite walls and the axle rod extends through these openings. A set screw 15 carried by section 11 locks the handle C on the axle 6 preferably in the center. Section 11 has a snug sliding fit on axle 6. When the section 11 is locked to the axle the handle rocks on the axle of the truck, wheeled support, or running gear D as a center to lower the gripping members to clamp the cover, and raise the cover above the ground in clamped relation in which latter position the cover may be transported.

The gripping members A and B as shown are both adjustable on the inner section 11 of handle C to move toward and away from each other in alignment to accommodate objects of varying widths or diameters. The inner gripping member is made with a sleeve 16 that slides on the handle section 11 next to the axle 6, and to which the center of a crown 17 of an integral yoke is secured preferably by welding. This crown extends at right angles to the sleeve and likewise to the handle C. The legs 18 of the yoke straddle the handle section 11 and each leg is bent substantially in the middle to provide downwardly and rearwardly projecting claws 19 on the lower portions of the legs. There is one claw on each side of the handle C and these claws terminate below the level of the handle so that the cover gripped by these claws at one end, or side, will be suspended below the handle. Above the bends in the legs, the ends of the angular cross brace 20 are secured preferably by welding, and the vertex of the brace is connected, preferably by welding, to a rear portion of the sleeve 16 in spaced relation to the crown 17.

In some applications of the gripping member A to the cover to be lifted and transported it may not be necessary to use a pair of claws 19. Where one point of gripping contact provided sufficient balance in the object or cover being lifted the angular claw 21 may be used. The inner end of one leg of this angular claw is anchored to the center of the crown 17 of the yoke, preferably by welding. The anchored leg of the claw 21 extends at right angles to the crown. Since sleeve 16 is slidable and rotatable on section 11 the sleeve may be rotated 180 degrees from the position where the pair of claws are used as shown in the drawings, and the single claw 21 is in position to be used in the depending relation. The single claw 21 is positioned between the claws 19—19 and in line with the axis of the handle C. The sleeve 16 is locked to handle section 11 by a set screw 22 extending through and threadably mounted on the sleeve and bearing on the periphery of this section.

The outer gripping member B also has a sleeve carriage 23 which slides on the outer portion of handle section 11 in end to end relation with respect to sleeve 16. The center of a cross bar 24 is anchored to the rear periphery of the sleeve preferably by welding. Cross bar 24 extends diametrically of sleeve 23 and handle C, and on each end is formed with a reduced trunnion 25 on which freely swings the shanks of complementary hooks 26, one on each side of the handle. The shanks of the hooks are detachably held on the trunnions by cotter pins 27. The sleeve 23 is locked on the handle section 11 by set screw 28 which is mounted on the inner portion of the sleeve. The hooks are outset relative to the claws 19—19 which they confront. Such construction provides proper balance in the objects to be lifted because the gripping contact is spaced at wider points at the highest end of the handle when the cart is being wheeled by the workman. In event the single claw 21 is used, it will be seen that the single point of contact is on the center line between the hooks making a well balanced suspension. On the free end of the bight portion of each hook 26 is an upstanding lip 29 which underlaps the inner corner of the cover being lifted. It will also be noted that the bights of the hooks 26 are considerably below handle C so that the cover or object suspended will be carried under the handle.

A manhole 30 is shown in the earth 31. In the regulation construction a cast iron ring 32 is imbedded in the bituminous or concrete road surface of the earth. The top of the ring is flush with the surface. About the inner periphery of this ring is a right angled shoulder 33 on which the margin of the round, cast iron, or other metal cover 34 rests. While there is shown a round manhole and cover therefor, other configurations in the nature of a polygonal cover may be lifted and transported by the handling device of the present invention. It will be noted that the cover sets in the ring flush with the surface surrounding the manhole. In the regulation covers be they round or polygonal, they are customarily formed with one pair of spaced peripheral notches 35 on one side and one pair of peripheral spaced notches 36 on the diametrically opposite side with the corresponding notches 35 of one pair in alignment with the corresponding notches 36 of the other pair. In such an arrangement of notches, the claws 19 of gripping member A are trained into the adjacent pair of notches 35, after locking sleeve 16 at the desired position on handle C. By rocking the handle C intermittently, the slanting claws force their way home underlapping the lower corner of the cover surrounding the notches.

Then the bight of hooks 26 are trained through the pair of notches 36, with the sleeve 23 being loose on the handle C. When the lips 29 seat in gripping relation underlapping against the corner of the cover about the notches 36, the sleeve 23 is moved to a position where a substantially radial pull is exerted toward the center of the cover as shown in Fig. 1, at which point the sleeve is locked to the handle by the set screw 28. The radial pull retains the cover in seated balanced position well up the incline of the claws and prevents the cover from sliding off the claws. Where only one notch similar to a notch of the pairs of notches is used on one side only of the cover instead of the pair of notches 35, then the sleeve 16 of gripping member A is loosened, and turned 180 degrees from the position shown in the drawing. Sleeve 16 is then locked with the single claw 21 turned to depending relation to the handle, and the claw is forced into the single notch by action similar to that described in connection with seating the pair of claws 19—19. Then the hooks 26 are seated in the pair of notches 36 in the manner heretofore described.

With the gripping members A, B clamped on the opposed sides of the cover as heretofore described and shown in Figures 1 and 2, the outer section 10 of the handle C is gripped in the hands of the workman and raised from a horizontal position to an angle to the horizontal. With the handle at an angle the cart may be pushed, pulled, or turned by a single workman with the cover clamped firmly in position. It will thus be seen that the cover may be raised and transported from its seated position on the ring of the manhole without the necessity of employing any other tools than is already afforded by the unique construction of the present invention.

Having thus described the invention, what is claimed as new and desired to be secured by Letters Patent of the United States is:—

1. A wheeled truck adapted for the removal of a manhole cover having spaced notches in its edge comprising a frame connected with the truck, a plurality of gripping members mounted on the frame, one of said members being adjustably connected to the frame to move relative to another, and means on each gripping member engageable with certain of the notches in the cover, when it is in position, to clamp the cover between the gripping members.

2. A wheeled truck adapted for the removal of a manhole cover when fitted flush with respect to the surrounding surface and having openings or notches on opposite sides of the cover, certain of which are opposed to one another, comprising, a frame connected at one end with the truck, opposed gripping members carried by the frame between the free end and the truck, one of said members being adjustably connected to the frame to move relative to the other, and means on each gripping member engageable one with a corresponding notch of the certain opposed notches in the cover to clamp the cover between the gripping members.

3. A wheeled truck adapted for the removal of a manhole cover adapted to be fitted flush with the surrounding surface and having peripheral notches certain of which are opposed to one another, comprising a single handle connected at one end to the truck, opposed gripping members carried by the handle between the free end and the truck, one of said gripping members being adjustably connected to the handle so as to move relative to the other, and means carried by each gripping member engageable one with a corresponding notch in the certain opposed notches to clamp the cover between the gripping members.

4. A wheeled truck adapted for the removal of a manhole cover for manholes wherein the cover is fitted flush with the surrounding surface, comprising a support, a frame rockably connected at one end to the support, at least two gripping members carried by the frame in spaced relation to each other to clamp spaced parts of the cover between them, and one of said gripping members being adjustably connected to the frame to move relative to the other.

5. A wheeled truck adapted for the removal of a manhole cover for manholes wherein the cover is fitted flush with the surrounding surface, comprising a support, a frame rockably connected at one end to the support, at least two gripping members carried by the frame in spaced relation to each other to clamp spaced parts of the cover between them, one of said gripping members being adjustably connected to the frame to move relative to the other, a rigid claw carried by one gripping member, and a swinging hook carried by the other gripping member.

6. A wheeled truck adapted for the removal of a manhole cover fitted flush with respect to the surrounding surface and having notches in its edge certain of which are opposed to one another, comprising a frame connected at one end with the truck, opposed gripping members carried by the frame between the free end and the truck, one of said members being adjustably connected to the frame to move relative to the other, means on each gripping member engageable one with a corresponding notch of the certain opposed notches in the cover to clamp the cover between the gripping members, the said means on one gripping member composed of a rigid claw, and the said means on the other gripping member comprising a pair of freely swingable hooks.

7. A wheeled truck having an axle and wheels journaled on each end of the axle adapted for the removal of a manhole cover adapted to be fitted flush with the surrounding surface and having peripheral notches certain of which are opposed to one another, comprising a handle connected at one end to the axle of the truck to rock therewith, opposed gripping members carried by the handle between the free end and the truck, one of said gripping members being adjustably connected to the handle so as to move relative to the other, means carried by each gripping member engageable one with a corresponding notch in certain opposed notches to clamp the cover between the gripping members, the said means on one gripping member composed of a rigid claw, and the said means on the other gripping member comprising a pair of swingable hooks one on each side of the handle.

8. A handling device comprising a truck including an axle having a wheel journaled on each end, an extensible handle connected at one end to the axle, a pair of sleeves slidable on the handle, a set screw on each sleeve coacting with the handle to lock the sleeves in any desired position, a rigid claw carried by one sleeve, a cross bar connected at its center to the other sleeve and extending on each side of the handle, and a hook swingable on each end of the cross bar one on each side of the handle.

9. A handling device comprising a truck including an axle having a wheel journaled on each end, a pair of sleeves slidable on the handle, a set screw on each sleeve coacting with the handle to lock the sleeves in any desired position, a rigid claw carried by one sleeve, a cross bar connected at its center to the other sleeve and extending on each side of the handle, and a hook swingable on each end of the cross bar one on each side of the handle.

MILDRED E. JACKSON,
*Administratrix of the Estate of Francis E. Jackson, Deceased.*